United States Patent
Bugnon et al.

[11] Patent Number: 6,148,190
[45] Date of Patent: Nov. 14, 2000

[54] SYSTEM AND METHOD OF HANDLING EMERGENCY CALLS IN A RADIO TELECOMMUNICATIONS NETWORK IN THE PRESENCE OF CLONED MOBILE STATIONS

[75] Inventors: Jacques Bugnon, Repentigny; Binh Nguyen, Ville St-Laurent, both of Canada

[73] Assignee: Telefonaktiebolaget L M Ericsson (Publ), Stockholm, Sweden

[21] Appl. No.: 09/187,935

[22] Filed: Nov. 6, 1998

[51] Int. Cl.[7] .............................. H04M 11/00; H04B 7/00
[52] U.S. Cl. .......................... 455/404; 455/527; 455/410
[58] Field of Search .................................. 455/404, 410, 455/411, 458, 527; 379/45, 37

[56] References Cited

U.S. PATENT DOCUMENTS

| | | | |
|---|---|---|---|
| 5,153,902 | 10/1992 | Buhl et al. ............................ | 455/414 |
| 5,335,265 | 8/1994 | Cooper et al. ......................... | 455/410 |
| 5,369,681 | 11/1994 | Boudreau et al. ..................... | 455/456 |
| 5,465,388 | 11/1995 | Zicker ................................... | 455/404 |
| 5,467,382 | 11/1995 | Schorman ............................. | 455/410 |
| 5,488,640 | 1/1996 | Redden et al. ........................ | 375/357 |
| 5,555,551 | 9/1996 | Rudokas et al. ...................... | 455/410 |
| 5,596,625 | 1/1997 | LeBlanc ................................ | 379/60 |
| 5,598,460 | 1/1997 | Tendler ................................. | 379/59 |
| 5,689,548 | 11/1997 | Maupin et al. ........................ | 379/59 |
| 5,873,042 | 2/1999 | Vo ........................................ | 455/458 |
| 6,038,437 | 3/2000 | Zicker ................................... | 455/404 |
| 6,038,440 | 3/2000 | Wu ....................................... | 455/410 |

FOREIGN PATENT DOCUMENTS

WO 97/21314  6/1997  WIPO.
WO 97/28659  8/1997  WIPO.

*Primary Examiner*—Nguyen Vo
*Assistant Examiner*—Charles N. Appiah
*Attorney, Agent, or Firm*—Smith & Danamraj, P.C.

[57] ABSTRACT

A system and method in a radio telecommunications network for reconnecting a disconnected emergency call between a mobile station having an emergency (emergency MS) and a public safety answering point (PSAP). The method reduces the probability that a second MS such as a cloned MS will respond to a reconnection attempt. If a second MS responds to a first reconnection attempt, procedures are implemented to locate and connect the emergency MS. The network includes a serving mobile switching center (MSC) serving the emergency MS that includes a re-paging mechanism and a reconnection timer. The PSAP includes an alarm generator that notifies the serving MSC when a second MS is connected to the PSAP rather than the emergency MS. Upon receiving an alarm from the PSAP, the serving MSC reattempts to page the emergency MS.

9 Claims, 3 Drawing Sheets

SYSTEM AND METHOD OF HANDLING EMERGENCY CALLS IN A RADIO TELECOMMUNICATIONS NETWORK IN THE PRESENCE OF CLONED MOBILE STATIONS

BACKGROUND OF THE INVENTION

1. Technical Field of the Invention

This invention relates to telecommunication systems and, more particularly, to a system and method of handling emergency calls in a radio telecommunications network.

2. Description of Related Art

When a mobile subscriber initiates an emergency call such as a 911 call, the call is connected through a serving mobile switching center (MSC) to an end office (EO) known as a Public Safety Answering Point (PSAP). There may be situations in which the call is then prematurely disconnected. This may be due to the subscriber hanging up, loss of radio signal, border rescan problems, loss of the subscriber's mobile station (MS) during an attack, or other reasons. Current and previous versions of TR45.2 (PN 3581) state that under these circumstances, the serving MSC attempts to reestablish the call. In other words, the serving MSC pages for the MS, and if a page response is received, an alert signal is sent to the responding MS. If the alert signal is answered, the call is reconnected to the PSAP.

However, since fraud and cloning of MSs is becoming more widespread, there is an increasing likelihood that the wrong MS will respond to the page attempt when the serving MSC attempts to reestablish the call. For example, a fraudulently cloned MS may respond to the page attempt. If this occurs, the cloned MS rather than the valid emergency MS may be inadvertently connected to the PSAP. Alternatively, it is also possible that a cloned MS could initiate the emergency call which is then prematurely disconnected. When the serving MSC attempts to reestablish the call, a valid MS may respond to the page attempt. If this occurs, the valid MS rather than the emergency cloned MS may be inadvertently connected to the PSAP.

There are no known prior art teachings of a solution to the aforementioned deficiency and shortcoming. In order to overcome the disadvantage of existing solutions, it would be advantageous to have a system and method of handling emergency calls in a radio telecommunications network in which an emergency MS is reconnected to the PSAP following a premature disconnection. The invention would reduce the probability of connecting the wrong MS, but if the wrong MS is connected by mistake, the invention would implement procedures to locate and reconnect the correct emergency MS.

SUMMARY OF THE INVENTION

In one aspect, the present invention is a method of reconnecting an emergency call between an emergency MS and a public safety answering point (PSAP) which includes the steps of attempting by a serving mobile switching center (MSC) to page the emergency MS, receiving a page response from a wrong MS , and connecting the call from the wrong MS to the PSAP. It is then determined by the PSAP that the correct emergency MS has not been reconnected. The PSAP then sends an alarm message to the serving MSC instructing the serving MSC to restart the paging process, and the serving MSC reattempts to page the emergency MS. This is followed by determining whether the emergency MS responded to the page attempt, disconnecting the call from the wrong MS to the PSAP upon determining that the emergency MS responded to the page attempt, and reconnecting the emergency MS to the PSAP.

In another aspect, the present invention is a system for reconnecting an emergency call between an emergency MS and a PSAP when the call has been disconnected before the call was finished. The system includes means for paging for the emergency MS in progressively larger paging areas as is known in the art, combined with means for connecting a responding MS to the PSAP, and means for sending an alarm from the PSAP to the serving MSC if a wrong MS without an emergency is connected to the PSAP. The alarm instructs the serving MSC to reattempt to page the emergency MS. The system also includes means for disconnecting the wrong MS and connecting the emergency MS to the PSAP if the emergency MS responds to the reattempted page.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
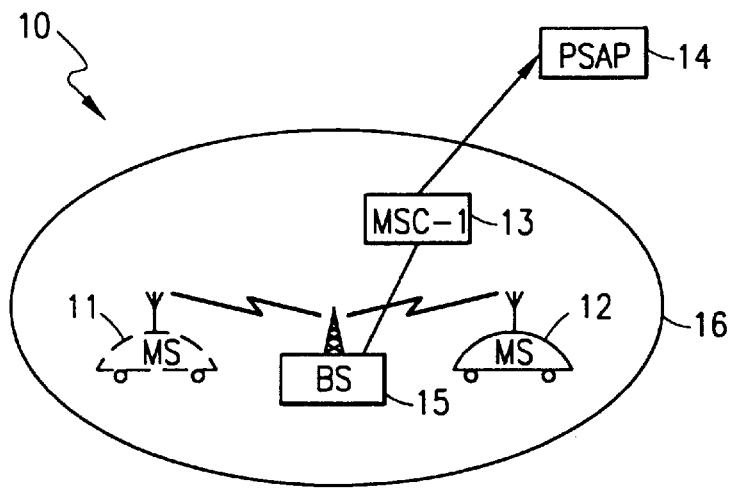
FIG. 1 (Prior Art) is a simplified block diagram of an existing radio telecommunications network in which a cloned mobile station (MS) prevents an emergency call from being reestablished with an emergency MS.

FIG. 1 is a simplified block diagram of an existing radio telecommunications network 10 in which a cloned mobile station (MS) 11 prevents an emergency call from being reestablished with an emergency MS 12. When the emergency MS first places the emergency call by dialing, for example 911, the call is connected through a serving mobile switching center (MSC) 13 to a Public Safety Answering Point (PSAP) 14. If the call is prematurely disconnected, the serving MSC attempts to reestablish the call by paging for the emergency MS through the base station (BS) 15. However, if the cloned MS 11 is located within the service area 16 of the MSC, the cloned MS may respond to the page, thereby preventing the emergency call from being reestablished with the emergency MS 12.

Figure 2:
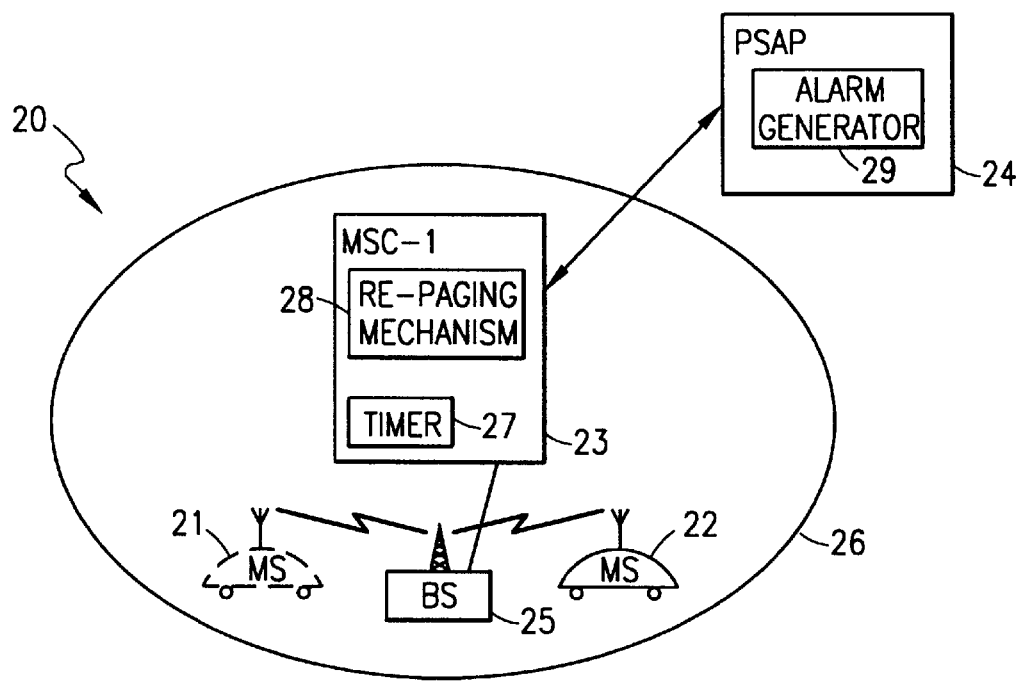
FIG. 2 is a simplified block diagram of a radio telecommunications network in which the system of the present invention has been implemented.

FIG. 2 is a simplified block diagram of a radio telecommunications network 20 in which the system of the present invention has been implemented. A cloned MS 21 and an emergency MS 22 are shown to be operating in the service area 26 of a serving MSC 23 and BS 25. The serving MSC is connected to a PSAP 24. The serving MSC includes a reconnection timer 27 and a re-paging mechanism 28, the functions of which are described below. The PSAP includes an alarm generator 29 to send an alarm to the serving MSC 23. The purpose of this alarm is described below.

As noted above, since fraud and cloning of MSs is becoming more widespread, there is an increasing likelihood that the wrong MS will respond to the page attempt when the serving MSC attempts to reestablish the call. For example, the valid MS 22 may initiate the emergency call which is then prematurely disconnected. When the serving MSC 23 attempts to reestablish the call, the cloned MS 21 may respond to the page attempt. Alternatively, the cloned MS 21 may initiate the emergency call which is then prematurely disconnected. When the serving MSC attempts to reestablish the call, the valid MS 22 may respond to the page attempt. In either case, the wrong MS may be inadvertently connected to the PSAP. For simplicity, the remainder of the description will indicate for exemplary purposes that the valid MS 22 initiates the emergency call, and the cloned MS is inadvertently connected to the PSAP when the call is reestablished. The invention is equally useful, however, if the cloned MS initiates the emergency call, and the valid MS is inadvertently connected to the PSAP when the call is reestablished.

Figure 3:
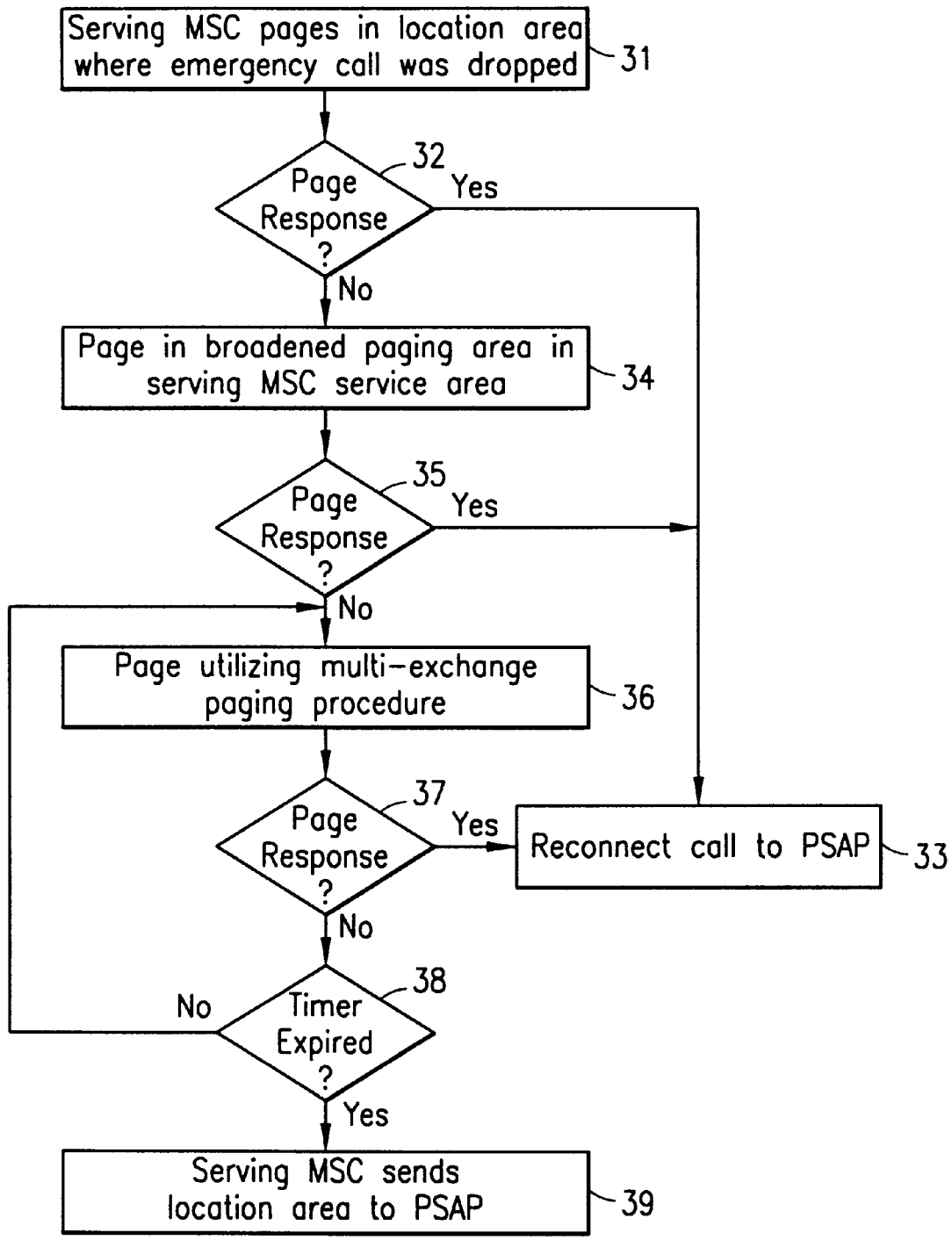
FIG. 3 is a flow chart of the steps involved when the present invention attempts to page a disconnected emergency MS.

The present invention solves the problem associated with the cloned MS 21 responding to the reconnection page attempt by utilizing several procedures. First, the present invention utilizes a progressive paging method. FIG. 3 is a flow chart of the steps involved when the present invention attempts to page a disconnected emergency MS. The serving MSC 23 initiates paging at step 31 in the same location area where the emergency MS 22 was located when the call was dropped. By first paging in a small area where it is highly likely to find the emergency MS, the probability that a cloned MS will respond to the page attempt is reduced. At step 32, it is determined whether or not there was a page response. If there is a page response, the process moves to step 33 where the emergency call is reconnected to the PSAP. If there is no page response, then the process moves to step 34 where the paging area is broadened, and may cover the entire service area 26 of the serving MSC. At step 35, it is again determined whether or not there was a page response. If there is a page response, the process moves to step 33 where the emergency call is reconnected to the PSAP. If there is no page response, then the process moves to step 36 where a multi-exchange paging procedure may be utilized to find the emergency MS if the serving MSC is unsuccessful in locating the emergency MS in its own service area. At step 37, it is again determined whether or not there was a page response. If there is a page response, the process moves to step 33 where the emergency call is reconnected to the PSAP. If there is no page response, then the process moves to step 38 where it is determined whether or not the reconnection timer 27 in the serving MSC has expired. If not, the process returns to step 36 and continues the multi-exchange paging procedure. However, if the timer has expired, the process ends the searching procedure, and the serving MSC sends the location area where the emergency MS was last located to the PSAP at step 39.

Figure 4:
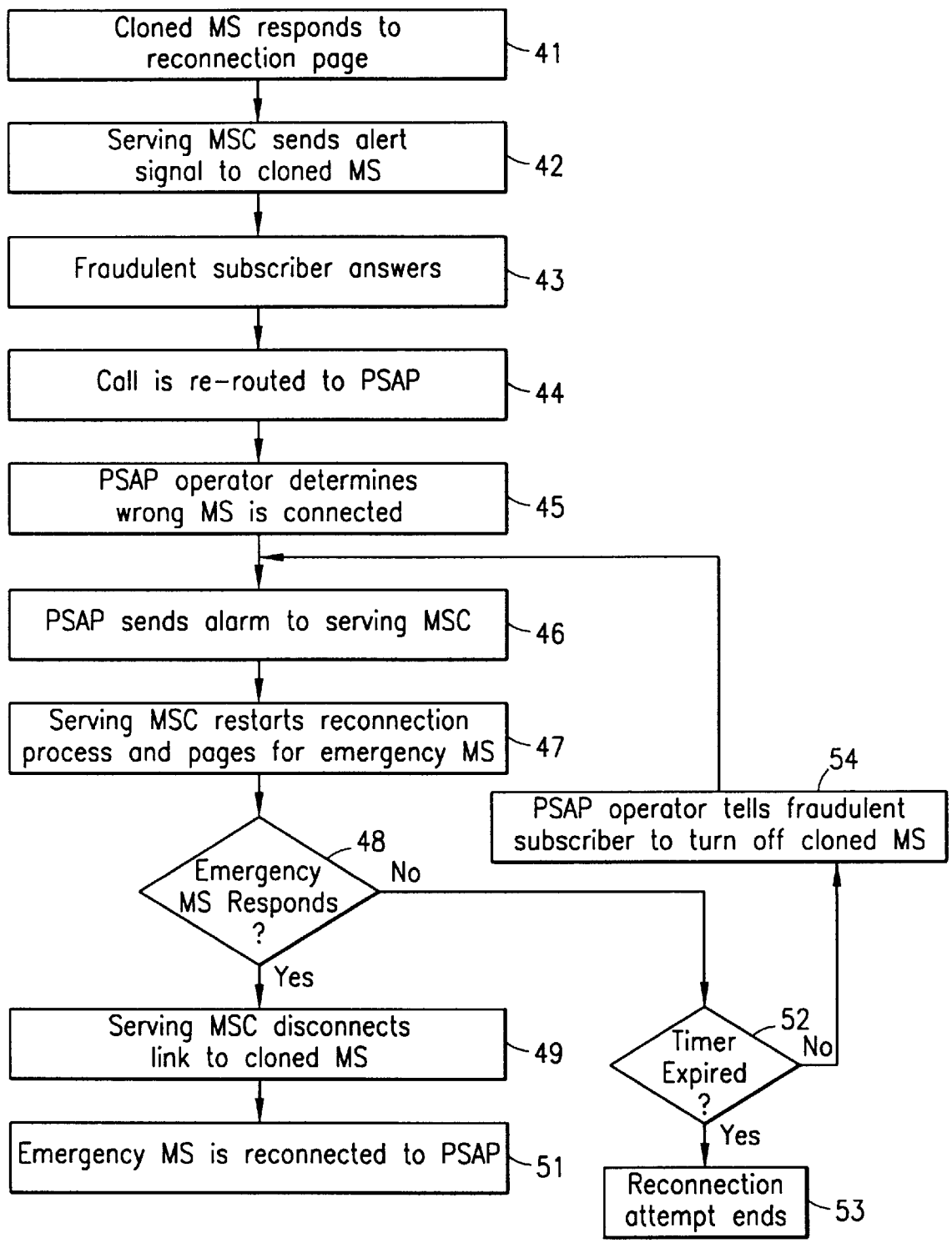
FIG. 4 is a flow chart of the method of the present invention when a wrong MS responds to a reconnection page instead of the emergency MS.

FIG. 4 is a flow chart of the method of the present invention when the cloned MS 21 responds to the reconnection page attempt instead of the emergency MS 22. At step 41, the cloned MS 21 responds to the page. The serving MSC then sends an alert signal to the cloned MS at 42, and when the fraudulent subscriber answers the call at 43, the emergency call is re-routed at step 44 to the PSAP 24. Since the fraudulent subscriber utilizing the cloned MS 21 does not have an emergency, the PSAP operator determines at step 45 that he is talking to the wrong MS. At step 46, the PSAP operator then utilizes the alarm generator 29 to send an alarm to the serving MSC 23. The alarm instructs the MSC to restart the reconnection process at 47. The serving MSC utilizes the re-paging mechanism 28 to page again for the emergency MS, even though the serving MSC is already connected to the cloned MS which has the same mobile indentification number (MIN) as the emergency MS. The re-paging process may utilize the paging method illustrated in FIG. 3. Alternatively, if the cloned MS has been disconnected from the PSAP, the re-paging process may page first in location areas other than the location area where the cloned MS is located in order to avoid receiving another page response from the cloned MS. However, if the cloned MS is still connected to the PSAP, then the cloned MS is unable to respond to the page attempt. Therefore, if the cloned MS is located in the same location area where the emergency call was dropped, the MSC may page first in this location area in order to maximize the probability of rapidly relocating the emergency MS.

At step 48, it is determined whether the emergency MS responded to the page. If the emergency MS responds, the serving MSC disconnects the link to the non-emergency (cloned) MS at 49, and connects the emergency MS to the PSAP at 51. If the emergency MS does not respond at 48, the process moves to step 52 where it is determined whether the reconnection timer 27 in the serving MSC has expired. If so, the reconnection attempt ends at 53. If the timer has not expired, the PSAP operator may tell the fraudulent subscriber to turn off the cloned MS at 54, and the process then returns to step 46 where the PSAP instructs the serving MSC to page again for the emergency MS.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. In a radio telecommunications network having a serving mobile switching centre (MSC) serving a mobile station with an emergency (emergency MS), a method of reconnecting a disconnected emergency call between the emergency MS and a public safety answering point (PSAP) when a first reconnection attempt has resulted in a second MS being connected to the PSAP, said method comprising the steps of:

determining by the PSAP that the emergency MS has not been reconnected;

sending an alarm message from the PSAP to the serving MSC instructing the serving MSC to reattempt to page the emergency MS;

paging first in a location area where the emergency MS was located when the emergency call was disconnected;

paging second in a broadened paging area in the service area of the serving MSC;

paging third in a plurality of MSCs utilizing a multi-exchange paging procedure;

reconnecting the emergency MS to the PSAP if the emergency MS responds to the page attempt;

determining whether a reconnection timer in the serving MSC has expired, upon determining that the emergency MS did not respond to the page attempt;

instructing by the PSAP, a subscriber utilizing the second MS to turn off the second MS; and instructing the serving MSC to restart the paging process.

2. In a radio telecommunications network having a serving mobile switching center (MSC) serving a mobile station with an emergency (emergency MS), a method of reconnecting a disconnected emergency call between the emergency MS and a public safety answering point (PSAP) when a first reconnection attempt has resulted in a second MS being connected to the PSAP, said method comprising the steps of:

determining by the PSAP that the emergency MS has not been reconnected;

sending an alarm message from the PSAP to the serving MSC instructing the serving MSC to reattempt to page the emergency MS;

reattempting by the serving MSC to page the emergency MS, the step of reattempting including steps of:

determining a location area where the second MS is located;

determining whether the second MS is still connected to the PSAP;

paging first in location areas other than the location area where the second MS is located upon determining that the second MS is not still connected to the PSAP; and paging next in the location area where the second MS is located; and reconnecting the emergency MS to the PSAP if the emergency MS responds to the page attempt.

3. In a radio telecommunications network having a serving mobile switching center (MSC) serving a mobile station with an emergency (emergency MS), a method of reconnecting a disconnected emergency call between the emergency MS and a public safety answering point (PSAP) when a first reconnection attempt has resulted in a second MS being connected to the PSAP, said method comprising the steps of:

determining by the PSAP that the emergency MS has not been reconnected;

sending an alarm message from the PSAP to the serving MSC instructing the serving MSC to reattempt to page the emergency MS;

reattempting by the serving MSC to page the emergency MS, the step of reattempting including steps of:

determining whether the location area where the second MS is located is the same location area where the emergency call was disconnected;

determining whether the second MS is still connected to the PSAP;

paging first for the emergency MS in the location area where the second MS is located upon determining that the location area where the second MS is located is the same location area where the emergency call was disconnected, and the second MS is still connected to the PSAP; and paging first in location areas other than the location area where the second MS is located upon determining that the second MS is not still connected to the PSAP; and reconnecting the emergency MS to the PSAP if the emergency MS responds to the page attempt.

4. The method of reconnecting an emergency call between an emergency MS and a PSAP of claim 3 further comprising the steps of:

determining whether a reconnection timer in the serving MSC has expired, upon determining that the emergency MS did not respond to the page attempt;

instructing by the PSAP, a subscriber utilizing the second MS to turn off the second MS; and instructing the serving MSC to restart the paging process.

5. In a radio telecommunications network having a serving mobile switching center (MSC) serving a mobile station with an emergency (emergency MS), a method of reconnecting an emergency call between the emergency MS and a public safety answering point (PSAP) when the call has been disconnected before the call was finished, said method comprising the steps of:

attempting by the serving MSC to page the emergency MS;

receiving a page response from a second MS which clones the emergency MS;

connecting the call from the second MS to the PSAP;

determining by the PSAP that the emergency MS has not been reconnected;

sending an alarm message from the PSAP to the serving MSC instructing the serving MSC to restart the paging process;

reattempting by the serving MSC to page the emergency MS;

determining whether the emergency MS responded to the page attempt;

disconnecting the call from the second MS to the PSAP upon determining that the emergency MS responded to the page attempt; and reconnecting the emergency MS to the PSAP.

6. The method of reconnecting an emergency call between an emergency MS and a PSAP of claim 5 further comprising the steps of:

determining whether a reconnection timer in the serving MSC has expired, upon determining that the emergency MS did not respond to the page attempt;

instructing by the PSAP, the subscriber utilizing the second MS to turn off the second MS; and instructing the serving MSC to restart the paging process.

7. The method of reconnecting an emergency call between an emergency MS and a PSAP of claim 6 wherein the steps of attempting by the serving MSC to page the emergency MS and reattempting by the serving MSC to page the emergency MS include the steps of:

paging first in a location area where the emergency MS was located when the emergency call was disconnected;

paging second in a broadened paging area in the service area of the serving MSC; and paging third in a plurality of MSCs utilizing a multi-exchange paging procedure.

8. In a radio telecommunications network having a serving mobile switching center (MSC) serving a mobile station with an emergency (emergency MS), a system for reconnecting an emergency call between the emergency MS and a public safety answering point (PSAP) when the call has been disconnected before the call was finished, said system comprising:

means for paging for the emergency MS in progressively larger paging areas;

means for connecting a responding MS to the PSAP;

means for sending an alarm from the PSAP to the serving MSC if the responding MS is a second MS without an emergency, said alarm instructing the serving MSC to reattempt to page the emergency MS; and means for disconnecting the second MS and connecting the emergency MS to the PSAP if the emergency MS responds to the page.

9. The system for reconnecting an emergency call between an emergency MS and a PSAP of claim 8 further comprising a timer in the serving MSC for stopping the paging process when the timer expires.

* * * * *